(12) United States Patent
Tielemans et al.

(10) Patent No.: US 11,706,275 B2
(45) Date of Patent: Jul. 18, 2023

(54) MEDIA STREAMING

(71) Applicant: THEO TECHNOLOGIES, Heverlee (BE)

(72) Inventors: Maarten Tielemans, Aarschot (BE); Pieter-Jan Speelmans, Diest (BE); Steven Tielemans, Leuven (BE); Egon Okerman, Leuven (BE)

(73) Assignee: THEO TECHNOLOGIES, Heverlee (BE)

( * ) Notice: Subject to any disclaimer, the term of this patent is extended or adjusted under 35 U.S.C. 154(b) by 0 days.

(21) Appl. No.: 17/618,982

(22) PCT Filed: Jun. 15, 2020

(86) PCT No.: PCT/EP2020/066429
§ 371 (c)(1),
(2) Date: Dec. 14, 2021

(87) PCT Pub. No.: WO2021/001136
PCT Pub. Date: Jan. 7, 2021

(65) Prior Publication Data
US 2022/0311817 A1    Sep. 29, 2022

(30) Foreign Application Priority Data

Jul. 4, 2019   (EP) .................................... 19184521

(51) Int. Cl.
*H04L 65/70*   (2022.01)
*H04L 65/752*   (2022.01)
*H04L 65/613*   (2022.01)

(52) U.S. Cl.
CPC .......... *H04L 65/752* (2022.05); *H04L 65/613* (2022.05); *H04L 65/70* (2022.05)

(58) Field of Classification Search
None
See application file for complete search history.

(56) References Cited

U.S. PATENT DOCUMENTS 5,953,506 A * 9/1999 Kalra ................. H04N 21/2662
                                                    375/E7.017
6,268,864 B1 * 7/2001 Chen ....................... G06T 13/80
                                                         345/428

(Continued)

OTHER PUBLICATIONS

Extended European Search Report and Written Opinion from corresponding Application No. EP19184521.3, dated Nov. 29, 2019.

(Continued)

*Primary Examiner* — Backhean Tiv
(74) *Attorney, Agent, or Firm* — Workman Nydegger (57) ABSTRACT

A method for streamed playback of media in a media client from a remote media service includes: a) determining address information for locating the service and for a starting time; b) by the address information, requesting and receiving a first media package from the service; the package having decoder configuration information, one or more frames, associated timing information for playback frames, and a pointer to a subsequent part of the media stream; c) configuring a decoder of the client by the decoder information; d) starting playback of the stream in the client at the starting time by providing the frames to the configured decoder; e) by the pointer, requesting a remaining portion of the media having subsequent frames of the media stream and associated timing information; f) receiving the subsequent frames as a stream and continuing playback by providing the subsequent frames and associated timing information to the configured decoder.

15 Claims, 5 Drawing Sheets

(56) References Cited

U.S. PATENT DOCUMENTS

| | | | | |
|---|---|---|---|---|
| 7,089,485 | B2* | 8/2006 | Azadet | H04L 1/0061 |
| | | | | 714/775 |
| 7,769,477 | B2* | 8/2010 | Geyersberger | G10L 19/173 |
| | | | | 370/511 |
| 8,005,102 | B2* | 8/2011 | Hosein | H04N 21/658 |
| | | | | 375/295 |
| 9,007,434 | B2* | 4/2015 | Newton | H04N 13/189 |
| | | | | 348/43 |
| 9,131,269 | B2* | 9/2015 | Price | H04N 19/61 |
| 9,294,808 | B2* | 3/2016 | Zink | H04N 21/435 |
| 9,560,366 | B2* | 1/2017 | Neuman | H04L 67/306 |
| 9,773,503 | B2* | 9/2017 | Neuendorf | G10L 19/167 |
| 10,469,885 | B2* | 11/2019 | Sun | H04N 21/4381 |
| 10,819,815 | B2* | 10/2020 | Thang | H04L 65/613 |
| 11,089,349 | B2* | 8/2021 | Song | H04N 21/47202 |
| 2005/0020201 | A1* | 1/2005 | Lane | H04L 65/70 |
| | | | | 455/3.01 |
| 2008/0154941 | A1* | 6/2008 | Park | H04N 21/85406 |
| | | | | 707/999.102 |
| 2012/0185570 | A1* | 7/2012 | Bouazizi | H04L 65/70 |
| | | | | 709/219 |
| 2014/0016785 | A1* | 1/2014 | Neuendorf | G10L 19/167 |
| | | | | 381/23 |
| 2016/0134673 | A1* | 5/2016 | MacInnis | H04L 65/80 |
| | | | | 709/231 |
| 2018/0213274 | A1* | 7/2018 | Song | H04N 21/47217 |
| 2019/0075179 | A1* | 3/2019 | Thang | H04N 21/6547 |
| 2019/0124173 | A1* | 4/2019 | Thang | H04L 65/752 |
| 2022/0311817 | A1* | 9/2022 | Tielemans | H04N 21/8456 |

OTHER PUBLICATIONS

International Search Report and Written Opinion from PCT Application No. PCT/EP2020/066429, dated Jul. 15, 2020.

* cited by examiner

MEDIA STREAMING

TECHNICAL FIELD

The present disclosure generally relates to the streaming of media from a media service to a media client over a communication network.

BACKGROUND

Media streaming is immensely popular nowadays. It allows viewers to start watching media content without the need to completely download the content beforehand. A large portion of the Internet traffic consists of such media streamed from media services to clients, typically from a content distribution network, a CDN, to a video player application running on a PC, a tablet, a smartphone, a set-up box, a TV etc. In media streaming, the video is further delivered on demand or on request of the client. The request then specifies a certain starting point in time upon which the video should start. This starting point may be explicit, e.g. by specifying it in the request, or implicit, e.g. where the starting point is derived from the time of the request which is the case for live streaming.

Media streams should exhibit a low start-up time to the viewer, i.e. there should be minimal time between the viewer's request for the stream and the actual playback. Nowadays, viewers desire instant response between the moment they activate the playback and the moment the first frame of the video appears on the screen. The same is applicable for skipping through the video, the viewer desires instant playback when selecting a different playback time within the video, i.e. when skipping through the video. For live streaming, also low latency is desired, i.e. the time between the moment that the action is recorded and the actual playback on the viewer's screen should be as small as possible. Another requirement is that the data footprint of the video should be small such that storage on the origin server and intermediate caching servers is small. Small storage sizes also result in shorter start-up times as the transfer times to the client over the bandwidth limited communication medium will be shorter. Moreover, a smaller data footprint also results in a lower cost for the communication network itself.

Different protocols and technologies for streaming video have been proposed. A first technology is progressive download which relates to the playback of media files on a client before the download of the media file is completed. A media player on the client that is capable of progressive download relies on meta data located in the header at the beginning of the media file. When the meta data and the first frames of the media have been downloaded and buffered, the media player will start the actual playback thereby considerably reducing latency. A problem with progressive download is that it inherently does not support live streaming and it doesn't support the switching between qualities and bit rates.

One group of streaming protocols are The Real-time Streaming Protocol (RTSP), Real-time Transport Protocol (RTP), and Real-Time Messaging Protocol (RTMP). However, as these protocols have difficulties to traverse firewalls and proxies and to cache on content distribution networks, CDNs, or by Internet service providers, ISPs, new streaming protocols that use the standard HTTP web protocol have emerged. Another group of protocols provide live streaming and switching between qualities by dividing media in smaller chunks or segments. A segment or chunk may then be played independently from another segment by providing an independent frame, also referred to as key frame, at the beginning of the segment. Such a key frame can be decoded by the client without any information on the preceding or subsequent frames. Such protocols may also offer adaptive bitrate streaming allowing the client to switch between different bit rates, resolutions or codec depending on the available resources. To achieve this, versions of the streams, each with a different bit rate, resolution of codec, are made available on the server for the client. Examples of such HTTP Adaptive Streaming, HAS, protocols are MPEG-DASH published as ISO/IEC 23009-1:2012, HTTP Dynamic Streaming by Adobe, HTTP Live Streaming (HLS) by Apple and Smooth Streaming, a Microsoft IIS Media Services extension.

The above mentioned streaming protocols still suffer from shortcomings, especially in terms of delay upon between the moment upon which the link to the media is available to the media player and the moment that the first frame is played.

SUMMARY

It is an object of the present invention to provide a solution for streamed playback of media that has a low start-up time, a low seeking delay and low latency while providing strong encoding and lower bandwidth requirements.

The scope of protection sought for the various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a method for streamed playback of media in a media client from a remote media service; the method comprising the following steps performed by the media client:
  a) determining address information for locating the remote media service and for a starting time within the media;
  b) by the address information, requesting and receiving in return a first media package from the remote media service; the first media package comprising decoder configuration information, one or more frames of the media from the starting time onwards, associated timing information for playback of the one or more frames, and a pointer to a subsequent part of the media stream;
  c) configuring a media decoder of the media client by the decoder configuration information;
  d) starting playback of the stream in the media client at the starting time by providing the one or more frames to the configured media decoder;
  e) by the pointer, requesting a remaining portion of the media comprising subsequent frames of the media and associated timing information;
  f) by the request, receiving the subsequent frames and associated timing information as a stream and continuing playback by providing the subsequent frames and associated timing information to the configured decoder.

Address information may be a reference to the media on the media service at the selected starting time. Such reference may be in the form of a Uniform Resource Identifier, URI, preferably a Uniform Resource Locator, URL. The starting time may then be provided implicitly or explicitly as part of the URL's path or as a query. This further enables performing the requesting and receiving of the first media package by a HTTP request for the first media package using such URL.

As the first media package comprises both the decoder configuration information, the first frame(s) and associated timing information, all information essential for initiating the playback is contained within this first package. To this end, the first package may just contain a single independent frame for initializing the initial view in the media client. Optionally, the first package may also contain one or more subsequent frames for the initial playback of the media. Advantageously, these subsequent frames are dependent frames.

The first media package further comprises a pointer to the subsequent part and thus remaining of the media stream, i.e. to the part subsequent to the one or more frames of the first package. As the pointer is contained in the package, the requesting and receiving of the remaining portion may be initiated directly upon receiving the first package and in parallel with the starting of the initial playback. Furthermore, as the configured decoder is also used for playback, the remaining portion comprises all essential information, i.e. subsequent frames of the media stream and associated timing information for further playback in the media client.

The method according to the above example aspect has several advantages. First of all, only a single reference to the media service is required to start playback. There is thus no need to first download a manifest file or the like that provides references to all kind of media segments in different representations and, thereafter, to download the first actual playable segment. Furthermore, there is also no need to first download a packet with configuration information, i.e. an initialization segment or file, for the decoder. As a result, the delay for starting the playback is reduced by one round-trip time. Moreover, the size of the first packet can be further optimized by only including the parts that are essential for playback, thereby further reducing the delay. By making the decoder configuration for the frames in the remaining portion dependent on the configuration provided by the first packet, also the size of the subsequent portions can be reduced drastically. Furthermore, frames from the subsequent portions can be played as they become available to the media client. There is thus no need to wait for the end of a segment or a for the end of a chunk of a segment.

According to an example embodiment, the pointer is indicative for a location of the subsequent part within a representation of the media on the media service. A representation is to be understood as a sequence of media frames with a certain property such as bit rate, resolution, quality, and coding. To this end, the media service may make the media available according to different representations, for example in different bit rates and/or resolutions. In other words, the media service first provides the first dedicated package for starting the playback and then hooks into an available representation by providing a pointer to the location within the representation. The media client may then retrieve the subsequent portions by a single byte range request, e.g. an HTTP byte range request. This way, the request will be cached by any intermediate caching server. Furthermore, the playback can be started at any arbitrary starting time and, thus, the media client does not have to first download complete segments to skip towards the intended starting time. Such behaviour is present in existing HAS protocols wherein the segments are typically in the order of seconds.

According to an example embodiment, the method further comprises:

obtaining information on a different representation of the media made available by the media service;

determining a switchover time within the media for playback of the media in the different representation;

performing steps b) to f) for playback of the media in the different representation from the switchover tome onwards.

Different representations may be made available by the media service. This information may for example be provided by a reference within the first media package. This way, just after the initial playback is started, the media player can further optimize the playback by switching to a different representation at the switchover time. Such switchover time may be at any time that a first package is available at the streaming service. Switching may does be performed nearly instantly when a first package is available for every frame. At that moment, the same steps b) to f) are repeated to start playback of the new representation. Again, as there is no need to download packets on a per segment basis, there is no additional delay or overhead involved in the switching between representations.

According to an example embodiment, the subsequent frames are dependent frames. The above method allows to provide the different representations by dependent frames only and to provide the independent frames within the first package. This is possible because the different representations are not provided in a segmented way. This both saves on storage for the media service and for network traffic between the media service and media client. When the playback would be corrupted, e.g. by dropped network packets, the media client may again request a first package to obtain an independent frame and continue playback accordingly.

According to a second example aspect, the disclosure relates to a method for streaming media from a media service to a remote media client; the method comprising the following steps performed by the media service:

a) receiving, from the remote media client, a request for the media at a starting time within the media;

b) providing the remote media client a first media package comprising decoder configuration information, one or more frames of the media from the starting time onwards, associated timing information for playback of the one or more frames, and a pointer to a remaining portion of the media stream;

c) receiving from the media client a request for the remaining portion;

d) providing the subsequent frames of the media stream and associated timing information to the media client.

The same example embodiments and technical advantages as for the first example aspect are applicable to this second example aspect.

According to a further example embodiment, the method according to the second example aspect further comprises:

making a first representation of the media available as a sequence of the first media packages;

making a second representation of the media available as a sequence of the subsequent frames of the media.

In other words, one representation of the media on the media service is provided as a sequence of the first media packages. This may be done on a frame by frame basis wherein each first package comprises a single independent frame. The other representations may then be made available by sequences of only dependent frames. This largely reduces the overhead on the media server because no independent frames are needed for the subsequent portions, i.e. the other representations, while being able to provide playback from any arbitrary starting time within the media.

Playback may then be achieved by retrieving the first media package from the first representation at the starting time; and retrieving subsequent frames and associated timing information from the second representation from the pointer onwards.

According to a further example embodiment, the making the first representation available further comprises generating the sequence of the first media packages from a live feed of the media; and wherein the making the second representation available comprises generating the sequence of the subsequent portions from the live feed of the media.

According to a third example aspect, the disclosure relates to a media client comprising at least one processor and at least one memory including computer program code, the at least one memory and computer program code configured to, with the at least one processor, cause the controller to perform the method according to the first example aspect.

According to a fourth example aspect, the disclosure relates to a media service comprising at least one processor and at least one memory including computer program code, the at least one memory and computer program code configured to, with the at least one processor, cause the controller to perform the method according to any of claims 12 to 15.

According to an example embodiment, the media service comprises one or more media servers.

According to an example embodiment, the media service comprises one or more caching servers.

According to a fifth example aspect, the disclosure relates to a computer program product comprising computer-executable instructions for causing a media client to perform at least the method according to the first example aspect.

According to a sixth example aspect, the disclosure relates to a computer program product comprising computer-executable instructions for causing a media service to perform at least the method according to the second example aspect.

According to a seventh example aspect, the disclosure relates to 22. A computer readable storage medium comprising computer-executable instructions for performing the method according to the first or second example aspect when the program is run on a computer.

BRIEF DESCRIPTION OF THE DRAWINGS

Some example embodiments will now be described with reference to the accompanying drawings.

DETAILED DESCRIPTION OF EMBODIMENT(S)

The present disclosure relates to the streaming of media from a remote media service to a media client. A media stream received by a client is a combination of ordered still pictures or frames that are decoded or decompressed and played one after the other within the media client. To this respect, the media client may be any device capable of receiving a digital representation of such media over a communication network and capable of decoding the representation into a sequence of frames that can be displayed on a screen to a user. Examples of devices that are suitable as a media client are desktop and laptop computers, smartphones, tablets, setup boxes and TVs. A media client may also refer to a media player application running on any of such devices. Streaming of media refers to the concept that the media client can request the media from a media service and start the playback of the media upon receiving the first frames without having received all the frames of the compete media stream. A streaming service is then a remote service that can provide such media streaming upon request of the media client to the media service over a communication network, for example over the Internet, over a Wide Area Network (WAN) or a Local Area Network (LAN).

Video received from a streaming server is compressed according to a video compression specification or standard such as H.265/MPEG-H HEVC, H.264/MPEG-4 AVC, H.263/MPEG-4 Part 2, H.262/MPEG-2, SMPTE 421M (VC-1), AOMedia Video 1 (AV1) and VP9. According to those standards, the video frames are compressed in size by using spatial image compression and temporal motion compensation. Frames on which only spatial image compression is applied or no compression is applied are referred to as temporal independent frames, key frames, independent frames or I-frames. An independent frame is thus a frame that is decodable independently from other frames in the video. Frames to which temporal motion compensation is applied, either in combination with image compression, are referred to as temporal dependent frames or, shortly dependent frames. Dependent frames are thus frames for which information of other frames is needed to decompress them. Dependent frames are sometimes further categorized in P frames and B frames. P frames use data from previous frames to decode and are thus more compressible than I frames. B frames can use both previous and forward frames to decode and may therefore achieve the highest amount of data compression.

Figure 1:
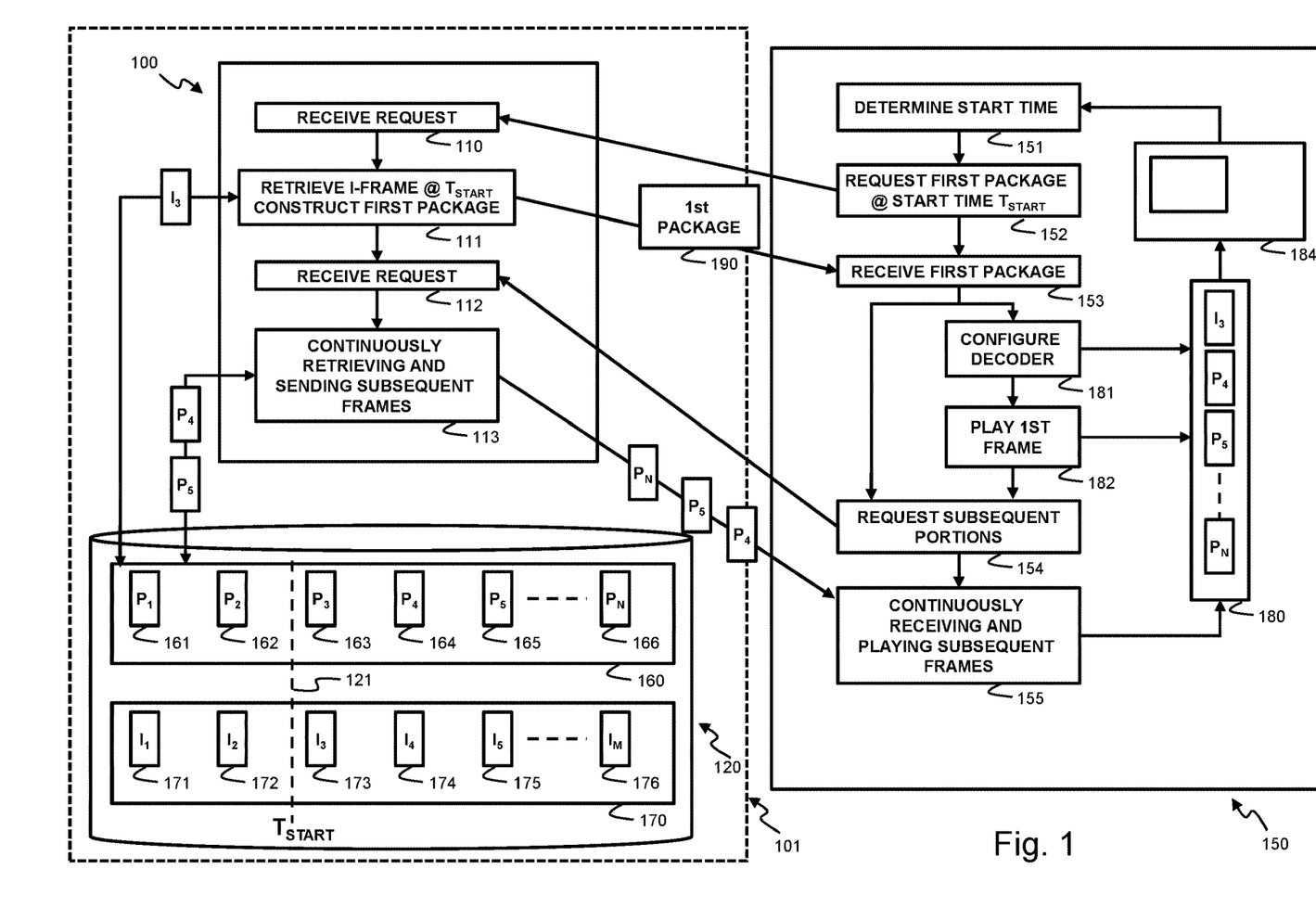
FIG. 1 shows an example embodiment of a media client and media service performing various steps for streaming media from the media service to the media client.

FIG. 1 illustrates a streaming service 101 comprising a controller or circuitry 100 for performing the various below described steps and a storage 120 for storing the media representations 160, 170. Streaming service 101 performs steps 110 to 114 for providing a media stream to a media client 150 according to an embodiment of the invention. FIG. 1 also illustrates steps 151-155, 181-182 performed by the media client 150 to display the streamed media within a viewport 184, for example a part of a display. In order to decode the encoded video stream, the media client 150 comprises a decoder 180. The steps performed by the media client 150 interact with the steps performed by the media service 101.

At a certain moment in time, the media client 150 determines in step 151 to stream media from media service 101 starting at a selected moment in time within the media, i.e. at a starting time 121. Starting time 121 may be the beginning of the media as the result of a user interacting with the media client 150 that starts watching the media. Starting time 121 may also be any arbitrary time within the course of the media as the result of a forward seeking action by the viewer during the playback of the video. Starting time 121 may also corresponds to a current time when the video stream is a live stream. The client 150 then proceeds to step 152 in which it sends a first request to the media service 101 for a first media package associated with starting time 121.

The first request contains address information for addressing both the streaming service 101, identifying the media that is to be streamed and the starting time within the media. The address information may be in the form of a uniform resource identifier, URI, or a uniform resource locator, URL. All three components may be embedded in the path of the URL, e.g. as 'http://streaming.service.com/media_identification/starting_time'. The starting time and/or the media identification may also be provided as a query in the URL. The starting time may be implicit, e.g. the starting time is the beginning when it is not specified. The starting time may also be specified in a predetermined format, e.g. in seconds relative from the beginning of the media. For live streaming, a specific 'now' starting time may be defined, i.e. to retrieve the latest available 'first package' for the identified media, e.g. as 'http://streaming.service.com/media_identification/now'.

Thereupon, the service 101 receives the request at step 110. The service then determines the independent frame which corresponds to the requested starting time 121 from a temporal independent version or representation 170 of the video. In the embodiment of FIG. 1, this temporal independent version is available in the storage 120 accessible by the controller 100. The temporal independent version of the video is a version of the video that only comprises independent frames 171 to 176. Apart from this version, the data store 120 also comprises a temporal dependent version 160 of the video comprising frames 161 to 166. In order to determine the corresponding independent frame, the service 101 may for example perform one of the following: i) select the independent frame 173 with a time stamp which is the closest to the starting time 121; ii) select the independent frame 173 which is subsequent to the starting time 121; or iii) select the independent frame 172 which comes prior to the starting time 121.

Thereupon, the service 101 constructs the first package 190 by including the retrieved independent frame, optionally one or more subsequent dependent frames from representation 160, the timing information associated with the retrieved independent frame needed for playback of the independent frame, the decoder configuration needed to decode the independent frame and optional subsequent dependent frames, and a pointer that refers to the location of the remaining portion in representation 160 of media stream. For example, the pointer may refer to the binary location of the subsequent dependent frame 164 within the representation 160.

Figure 2:
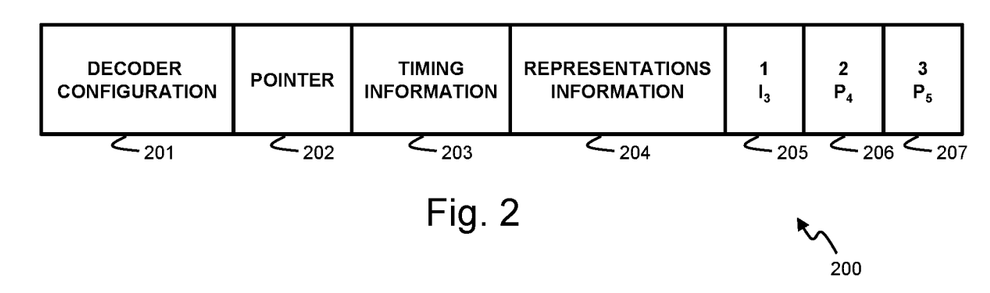
FIG. 2 shows an example embodiment of a first media package exchanged between a media service and media client for initializing a media stream.

FIG. 2 illustrates an example 200 of a format for the first package 190. The format 200 comprises a field 201 for the decoder configuration, a field 202 with a binary pointer to the subsequent portion of the video, a field 203 with timing information needed for the playback of the frames in the first package, a first independent frame 205 and one or more dependent frames 206, 207. The timing information may also be provided separately for each frame by embedding it within the frame itself. The first package 200 may also comprise only the first independent frame 205 and no further dependent frames. In that case, the pointer 202 refers to the location of the frame subsequent to the independent frame. Optionally, the first package may also comprise information on other representations of the media that are made available by the streaming service 101. Such information may be provided in the form of a URL to a manifest file that is available on the streaming service 101, for example a manifest file following the Common Media Application Format (CMAF) for segmented media according to ISO/IEC 23000-19.

Alternatively to the constructing of the first package by the controller 100, the first package 190 may also be stored onto the storage 120 by storing each independent frame 171-176 in the format 200. In that case, the controller 100 only retrieves the first package 190 from the storage 170 that is associated with the selected starting time 121.

Advantageously, the requests and response for the first package 190 between the client 150 and the server are performed according to the Hypertext Transfer Protocol (HTTP), i.e. by an HTTP GET request from the client and HTTP response from the server.

Thereupon, media client 150 receives the first package 190 in step 153 and proceeds to step 181 wherein the decoder information is extracted from the first package 190, e.g. from field 201, and used for configuring the decoder 180. Next, in step 182, media client 150 retrieves the first independent frame from the first package and forwards it to the configured decoder for further decoding and immediate playback within the viewport 184. Thereupon, if there the first package 190 comprises subsequent dependent frames, the media client 150 also provides those frames to the configured decoder 180 for subsequent playback. At that moment, playback of the media has thus started.

Besides steps 181-182 and preferably in parallel, the media client also proceeds to step 154 and constructs a request for retrieval of the remaining portion of the media. To this end, media client 150 retrieves the pointer 202 from the first package and constructs a request to the media service 101 for the stream starting at the location within the stream as provided by the pointer. The pointer 202 may correspond to an identification of the representation 160 that is made available by the streaming service 151 together with a byte location of the subsequent dependent frame within the representation 160. With this information, the media client then constructs a request to retrieve the data subsequent to this byte location within the identified representation 160. Advantageously the request is an HTTP byte range request wherein the start of the range is determined from the pointer. Support for byte range requests was introduced in HTTP/1.1 and is specified in detail in the IETF's RFC 7233 of June 2014.

At the streaming service 101, the request is received at step 112 upon which the server proceeds to step 113 to retrieve and send the requested remaining portion. To this respect, the server retrieves the subsequent dependent frames from the requested location onwards. Depending on the application protocol between the media client 150 and the streaming service 101, the subsequent dependent frames may be sent as a continuous byte stream as is the case with an HTTP byte range request. At the side of the media client, in step 155, the media client will start receiving the subsequent frames shortly after the request. Upon receiving the first of the subsequent frames, the media player starts forwarding the subsequent frames to the decoder 180 such that the playback that was started in step 182 continues. The streamed playback according to steps 113 and 155 may then be continued until the end of the stream, until the streaming service interrupts the streaming or until the media client interrupts the ongoing stream, e.g. by a user interaction.

Figure 3:
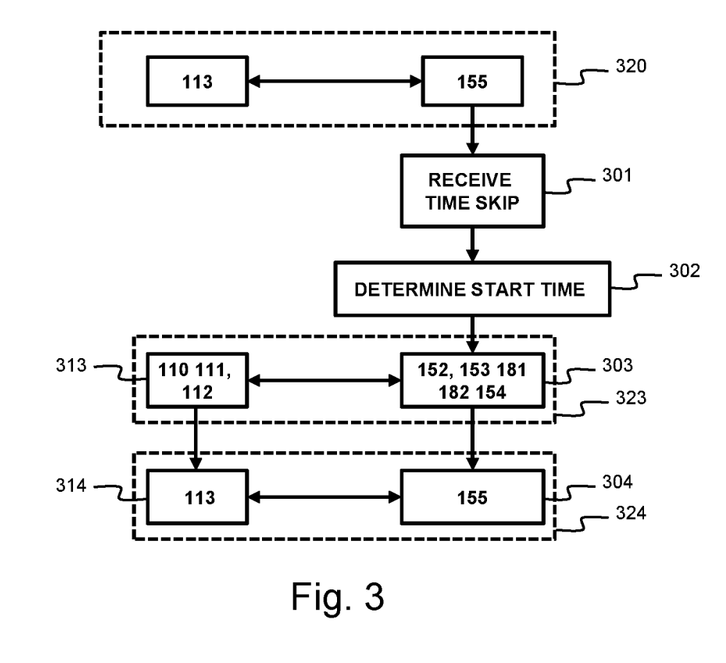
FIG. 3 shows steps for streaming media from the media service to the media client when skipping playback of the media forward or backwards.

FIG. 3 illustrates further steps 301-304 and 313-314 performed by respectively the media client 150 and the media service 101 according to an example embodiment. These further steps are initiated during an ongoing streaming session 320 between the client 150 and service 101, i.e. during the execution of the steps 113 and 155. During the streaming session 320, the media client 150 determines at a certain moment 301 to skip the playback of the video to another time within the video, either forward or backwards. The decision to skip may be initiated by a user interaction, typically by the viewer of the video. Upon receiving the skipping command 301, the media client proceeds to step 302 to determine the new starting time of the skipped video. This step may be performed similar to step 151. Then, the media client proceeds to step 303 wherein the first package associated with the new starting time is requested and received from the media service 101 and displayed on the viewport 184. At that moment, the skipping is visible in the viewport 184 and, thus, to the viewer. At that moment, the media client may abort the ongoing streaming session 320. Similarly, the media service 101 receives the request, obtains the first package and sends it to the client 150 in a step 313. These steps 303 and 313 may be performed similar to respectively steps 152-153, 181-182 and steps 110-112 with the difference that the starting time now corresponds to the new starting time to which the playback was skipped. To this respect, steps 303, 313 may be considered as the initiating of the skipped streaming session 323. Thereafter, the media client and service setup the remainder of the skipped streaming session 324 in respective steps 304 and 314 that are performed similarly to respective steps 155 and 113. By performing the above described step for skipping playback of media within the client, the skipping will appear nearly instantly to the viewer because the playback can start from the moment that the first frame of the first package is processed by the decoder. There is thus need to wait for the receival of a complete media segment or of a chunk of such a media segment. Moreover, the received independent frame of the first package is at the skipped starting time within the media. Therefore there is no need to search for an earlier independent frame an decode first a set of dependent frames until arriving at the actual skipped starting time within the media.

Figure 4:
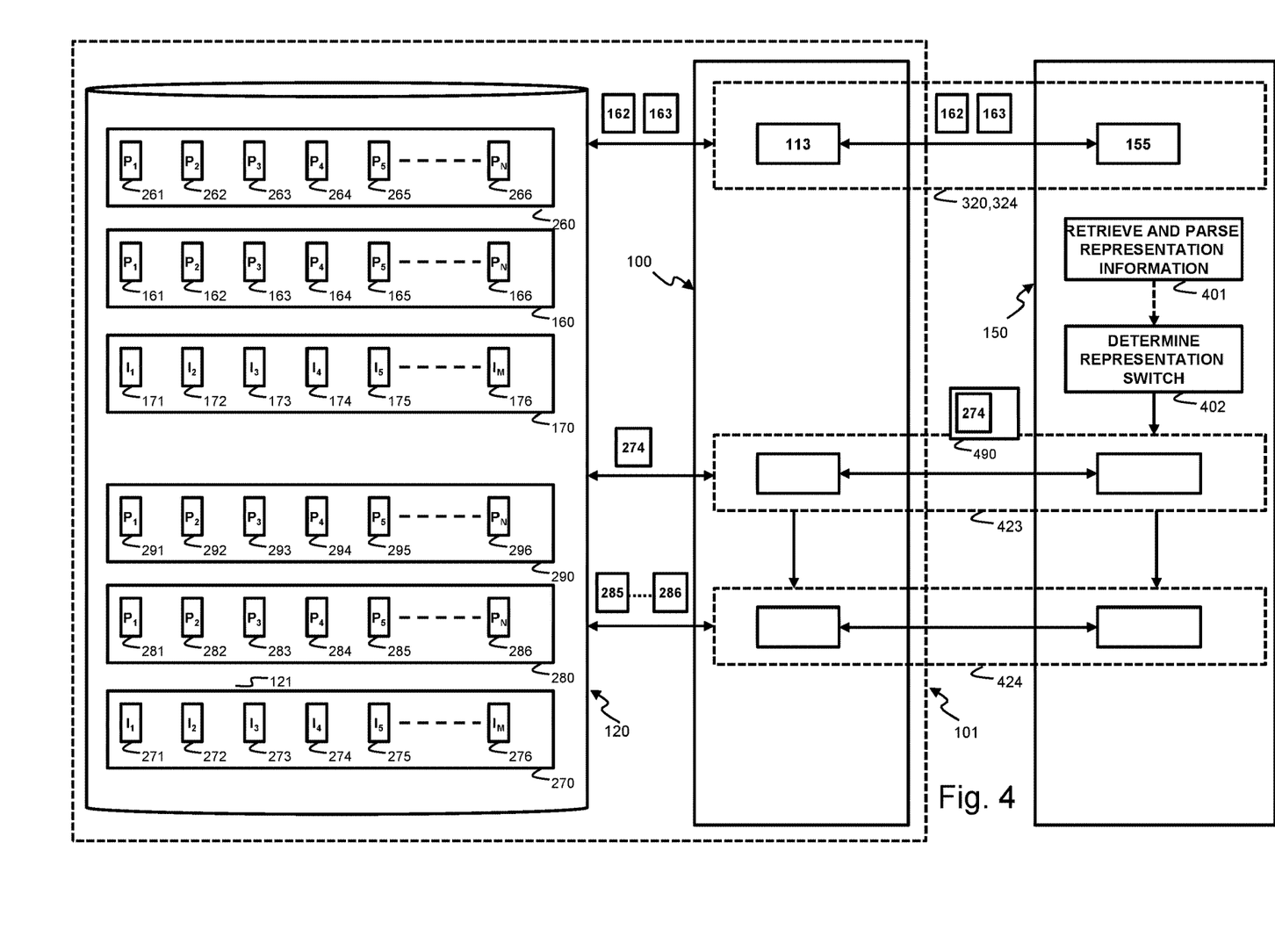
FIG. 4 shows an example embodiment of a media client and media service performing various steps for streaming media from the media service to the media client and for performing adaptive bit rate switching by switching to a different representation.

FIG. 4 illustrates steps performed by streaming client 150 and streaming service 101 according to an example embodiment for switching seamlessly between different representations of the media. To this end, streaming service 101 makes different representations of the media available. This may be done by storing the different representations onto storage 120. Similar to the example of FIG. 1, both the temporal independent version 170 and the temporal dependent version 160 of the media is available on storage 120. Additionally, storage 120 stores also further representations with different bit rates and/or resolutions of the media allowing for bit rate adaptation by the media client 150. Storage 120 comprises the first temporal independent version 170 of the media with a first resolution having independent frames 171 to 176. Storage 120 further stores two temporal dependent versions 160 and 260 each having the same resolution but a different bit rate, e.g. by applying a different encoding. Representations 160 and 260 respectively have frames 161 to 166 and 261 to 266. As an example, representation 160 may be a high-quality version of the media with a higher bit rate then the second representation 260 which offers a lower video quality at a lower bit rate. Similarly, storage 120 may also comprise a second temporal independent version 270 of the video with a second resolution having independent frames 271 to 276. The second resolution may for example be a smaller resolution targeted to mobile devices with smaller screen resolutions. Storage 120 also comprises two temporal dependent versions 280 and 290 each having the second resolution but again with different bit rates. Representations 280 and 290 respectively have frames 281 to 286 and 291 to 296.

To enable the adaptive bit rate switching, media client 150 first determines the different available representations, i.e. the representation information. The representation information may be made available by the streaming service 101 upon request. A reference to this information may be provided to the media client within the first packet 190, for example by specifying a URL to the information within field 204 of the first package 190. Alternatively, the information may also be embedded directly within field 204. The step of retrieving the representation information and processing or parsing of this information is illustrated by step 401 in FIG. 4. This step may be performed in parallel to an ongoing streaming session, e.g. during a session 320, 324. Then, at a certain moment, the media client determines during a step 402 to switch to another representation of the media. The determination 402 itself may for example be decided by monitoring the quality of the playback, by monitoring the ingress rate of the incoming frames at the media player, by monitoring a frame buffer within the media client or by any other known adaptive bit rate switching mechanism. In the example of FIG. 4, the media client decides to switch from representation 160 to representation 280.

Following the decision to switch to the other representation, the media client initiates a new streaming session 423 with the media service 101 by the exchange of a new first package 490. This initiation may be performed similarly to the initiation step 323 as described with reference to FIG. 3 and FIG. 1 with the difference that the request 152 now indicates the new representation and starting time for the playback of the new representation. The media service 101 then responds with the first package 490 comprising the independent frame corresponding with the requested starting time and according to the requested representation. In the example of FIG. 4, media service 101 embeds independent frame 274 within the first package 490 as this frame serves as a temporal independent frame of the requested representation 280. First package 490 further contains a pointer to the subsequent dependent frame within representation 280, i.e. to the start of frame 285. Similar to steps 181, 182, the media client then configures the decoder for playback of the new representation and starts the playback of the media at the requested starting time by providing the first independent frame 274 to the decoder. Similar to the setup of streaming session 324, the media client also establishes the actual steaming session 424 with the media service 101 by requesting and continuously receiving the subsequent dependent frames starting at dependent frame 285.

By FIG. 1 to FIG. 4 and accompanying description example embodiments are described for streaming media from a media service 101 to a media client 150, to skip playback of the media forward or backward and to adapt the bit rate of the media by changing to a different representation. Different specific implementations, variations and optional additions to these example embodiments will now be described.

The steps performed by media client 150 may be performed within a browser application such as for example Google Chrome, Mozilla Firefox, Internet Explorer, Safari, Microsoft Edge and Opera. The steps may also be performed within any computer application that uses a browser engine such as for example Gecko, WebKit, Blink, Trident and EdgeHTML. Such browser application or application having a browser engine may be provided on capable devices such as for example a desktop or laptop computer, tablet device, smartphone, television, and a digital media player (DMP). The performed steps may further be embedded within the application code of the browser engine thereby providing standard support for the described streaming. When a browser or browser engine provides such standard support, then it is sufficient to provide a single reference of the media to the media client. For example, in a browser application, this reference may be provided to the media client in the form of a URL on a web page. Alternatively, all or part of the steps may be provided for execution within the media client, i.e. the program code for performing these steps are loaded from an external location. For example, in a browser application, the necessary program code for executing the step may be provided within the downloaded webpage or referred to from within the webpage. The program code may further be formatted in a standard format such as JavaScript, a high-level, interpreted programming language that conforms to the ECMAScript specification.

Apart from the video frames, also other media content may be streamed to the media client 150 in a similar fashion. Audio accompanying the video may also be stored on storage 120 and streamed to the media client 150. This audio may be embedded within the specific representations or may be stored independently from the representations and joined together with the frames during transmission to the media client 150. Also, different audio streams may be made available by the media service, e.g. in different languages. Further information on these audio streams may then be provided within the first package in a similar way as how the representation information is provided. Also, other content such as subtitles may be made available by the media service 101 and streamed to the media client.

Each subsequent dependent frame may also be encapsulated by the streaming server in a frame packet with an additional header. The header may then comprise further information about the content of the packet. Such header may comprises associated timing information such as a decode time stamp, a presentation time stamp, the timescale, and/or the frame duration. The decode time stamp is a number which parameterizes the frame in time. It describes the timestamp of this frame on the decoding timeline, which does not necessarily equal the presentation timeline used to present the media. The timestamp may further be expressed in timescale units. The presentation time stamp is a number which describes the position of the frame on the presentation timeline. The timestamp may further be expressed in timescale units. The timescale is the number of time units that pass in one second. This applies to the timestamps and the durations given within the frame. For example, a timescale of 50 would mean that each time unit measures 20 milliseconds. A frame duration of 7 would signify 140 milliseconds. The frame duration is an integer describing the duration of the frame in timescale units. The above described timing information may also be used for the associated timing information as provided in the first packet 190 for initiating the streaming session.

Figure 5:
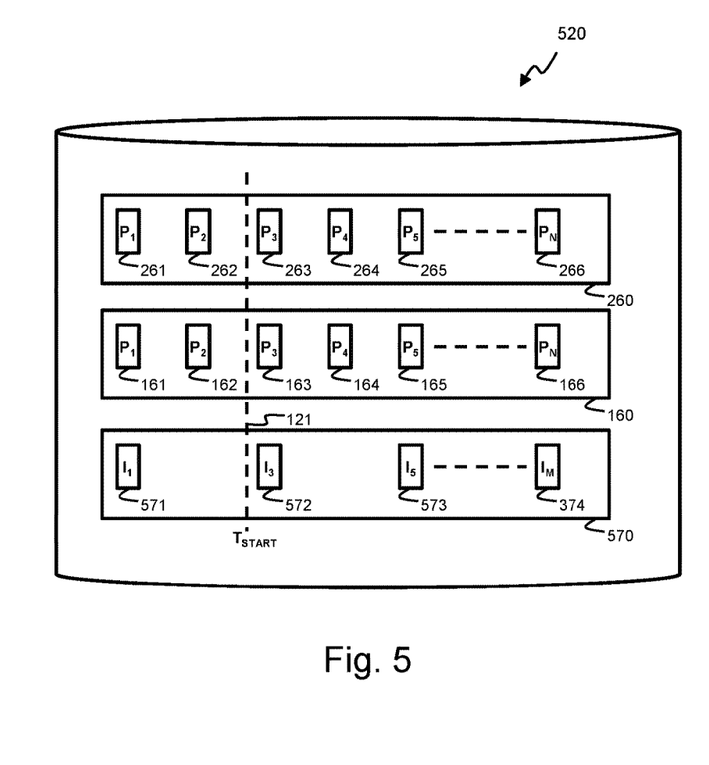
FIG. 5 shows an example embodiment of a media storage on which one independent representation and two dependent representations of media are stored.

It is not necessary that an independent frame is available for each corresponding dependent frame. FIG. 5 shows an example embodiment 520 of the data storage 120 where this is the case. Data storage 520 stores three representations 570, 160 and 260 of a video. The first version 570 is a temporal independent version comprising key frames 571 to 574. The second and third versions 160 and 260 are temporal dependent versions having respective frames 161 to 166 and 261 to 260. The frame rate of the first version 570 is lower than the frame rate of the dependent versions 160 and 260. In the example of FIG. 5, the frame rate of the first version 570 is half the frame rate of the dependent versions 160 and 260. This means that not every dependent frame is aligned with an independent frame. When the streaming service 101 then request for an independent frame corresponding with the starting time 121 for construction the first packet 190, the same selection process as for step 111 of FIG. 1 may be followed. The difference is that the selected independent frame may have a larger offset in time from the starting time 121 than in the case of FIG. 1. The delay between the request of the media client 150 and the playback of the first frame will be the same.

Figure 6:
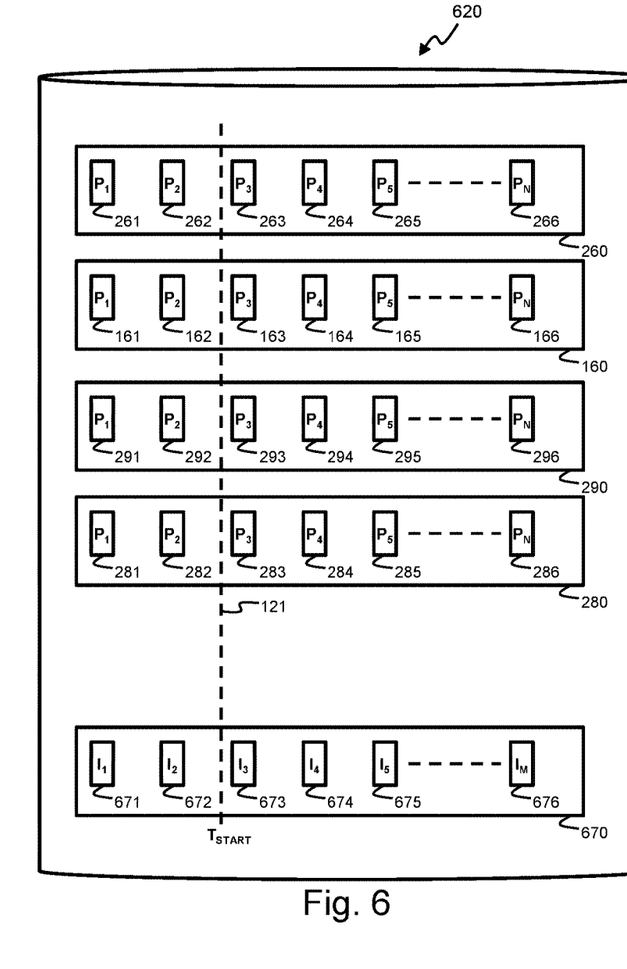
FIG. 6 shows an example embodiment of a media storage on which one independent representation and four dependent representations of media are stored.

It is further not necessary that there is an independent version available for each resolution. FIG. 6 illustrates a storage 620 according to an embodiment where this is the case. Storage 620 also provides a temporal independent version 670 and temporal dependent versions 160, 260, 280 and 290 of a video to clients upon request. Similar to storage 120, streaming service 101 retrieves the different frames from data storage 620. Storage 620 also comprises the two temporal dependent versions 160 and 260 each having the same first resolution but a different bit rate. Versions 160 and 260 respectively have frames 161 to 166 and 261 to 266. Storage 620 also comprises the two temporal dependent versions 280 and 290 each having a second resolution but again with different bit rates. Versions 280 and 290 respectively have frames 281 to 286 and 291 to 296. Different from the data store of FIG. 4, data store 620 only comprises one independent version 670 of the video. Preferably, this version 670 has at least the highest resolution of the dependent versions. Version 670 may further comprise the source frames of the video wherein the source frames have a different encoding than the dependent versions, for example a lossless compression or even no compression at all. Therefore, version 670 may have independent frames which are not supported by the decoder of the client. In this case, during construction of the first packet 190, the streaming service converts and encodes the retrieved independent frame into the appropriate format.

Figure 7:
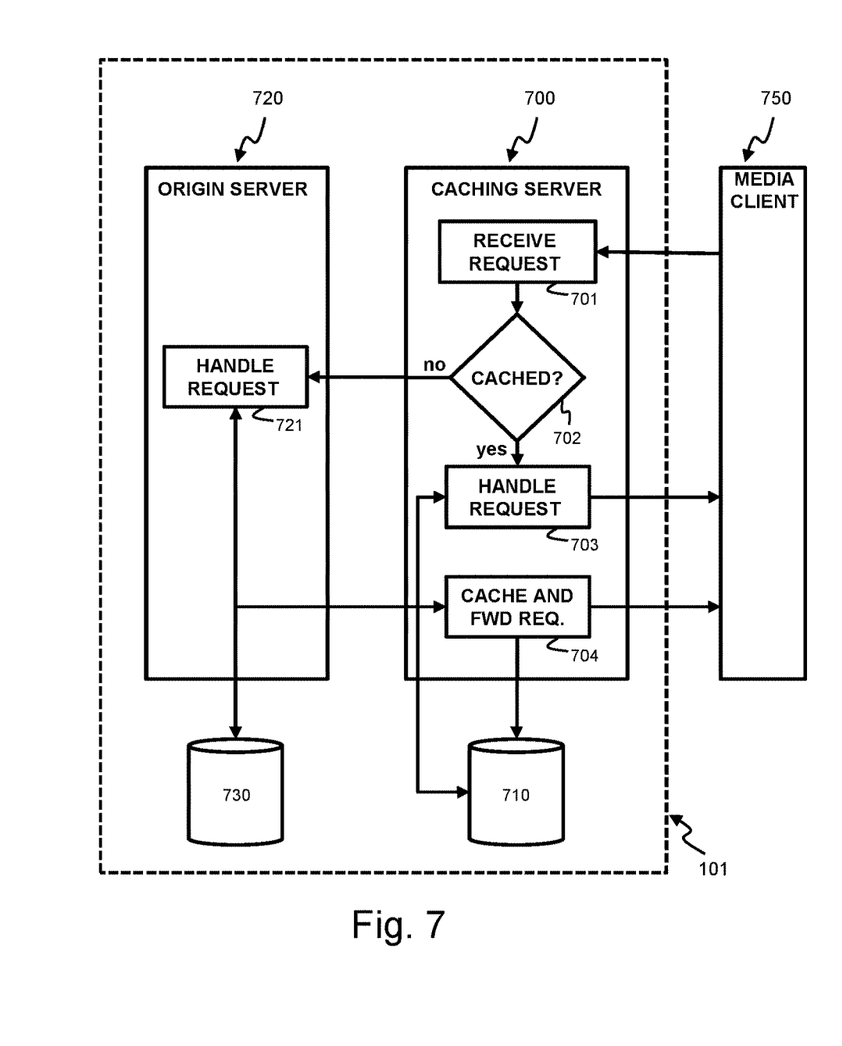
FIG. 7 shows an example embodiment of a media service having an origin server and cache server for streaming media to a media client.

Streaming service 101 may be implemented within a communication network in different ways, over different locations and onto different hardware components. FIG. 7 illustrates an implementation of streaming service 101 according to an example embodiment wherein the functionality of the streaming service is duplicated over the communication network for caching purpose. When used as a caching server 720, the server receives the requests according to steps 110 or 112 from the media client 750 in the step 701. The server then first verifies in step 702 whether a response to this request has already been cached in data store 710. If so, the server handles the request in step 703 and handles the request itself. If server 700 cannot handle the request, it forwards the request to an upstream server, e.g. the origin server 720. Upon receiving this request, the origin handles the request in a step 721. As server 720 is an origin server, all frames are available to the server 720 and the request will thus always be handled. The response with the requested frame(s) is then send back to the client. As the caching server is located between the client 750 and the origin server 730 in the communication network, the caching server will intercept the response in step 704 and cache the frames in data store 710 and, at the same time, forward the response to the client 750.

Figure 8:
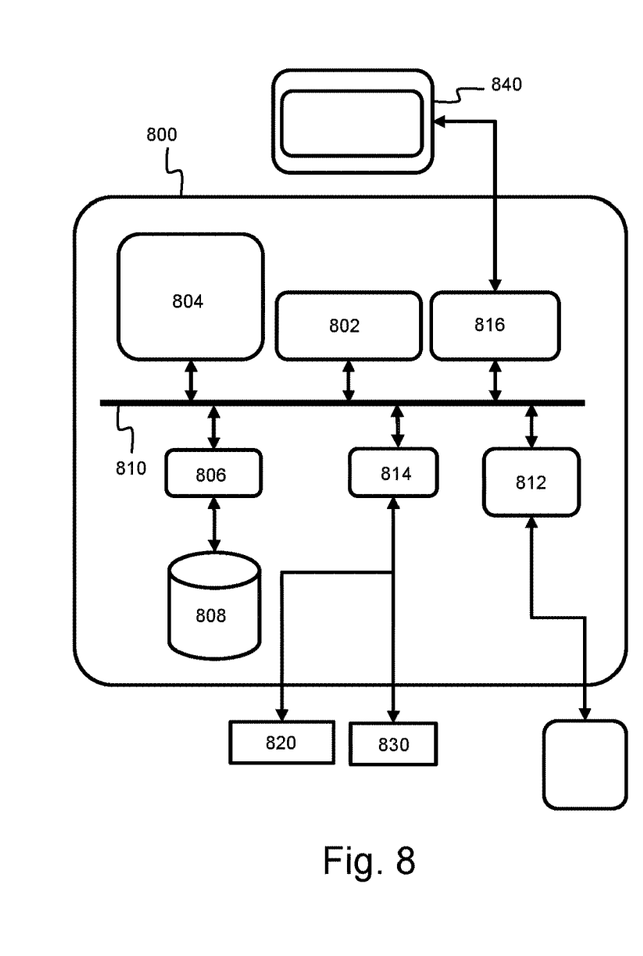
FIG. 8 shows an example embodiment of a suitable computing system for performing one or several steps in embodiments of the invention.

FIG. 8 shows a suitable computing system 800 enabling the performance of the described steps according to the various embodiments. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as for example one or more Ethernet interfaces that enables computing system 800 to communicate with other devices and/or systems, for example with other computing devices 100, 150, 700, 750, 720. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage element(s) 808 above is/are described as a local disk, in general any other suitable computer-readable media such as a removable magnetic disk, optical storage media such as a CD or DVD, -ROM disk, solid state drives, flash memory cards, . . . could be used. Computing system 500 could thus correspond to the circuitry for executing the steps of the media client 150, 750 and media service 101, 700, and 720.

As used in this application, the term "circuitry" may refer to one or more or all of the following:
(a) hardware-only circuit implementations such as implementations in only analog and/or digital circuitry and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for streamed playback of media in a media client from a remote media service; the method comprising the following steps performed by the media client:
   a) determining address information for locating the remote media service and for a starting time within the media;
   b) by the address information, requesting and receiving in return a first media package from the remote media service; the first media package comprising decoder configuration information, one or more frames of the media from the starting time onwards, associated timing information for playback of the one or more frames, and a pointer to a subsequent part of the media stream;
   c) configuring a media decoder of the media client by the decoder configuration information;

d) starting playback of the stream in the media client at the starting time by providing the one or more frames to the configured media decoder;

e) by the pointer, requesting a remaining portion of the media comprising subsequent frames of the media stream and associated timing information;

f) by the request, receiving the subsequent frames and associated timing information as a stream and continuing playback by providing the subsequent frames and associated timing information to the configured decoder.

2. The method of claim 1 wherein the pointer is indicative for a location of the remaining portion within a representation of the media on the media service.

3. The method of claim 2 wherein the requesting the remaining portion comprises requesting for a byte range of the representation starting at the location indicated by the pointer.

4. The method according claim 3 wherein the requesting the byte range is an HTTP byte range request and
wherein the requesting and receiving the first media package is performed by a HTTP request for the first media package.

5. The method according to claim 1 wherein the address information comprises a Uniform Resource Identifier, URI.

6. The method according to claim 1 wherein the method further comprises:
obtaining information on a different representation of the media made available by the media service;
determining a switchover time within the media for playback of the media in the different representation;
performing steps b) to f) for playback of the media in the different representation from the switchover time onwards.

7. The method according to claim 6 wherein the first media package comprises a reference to the information on the different representation.

8. The method according to claim 1 wherein the first frame of the one or more frames of the first media package is an independent frame.

9. The method according to claim 1 wherein the one or more frames of the first media package correspond to a single independent frame.

10. The method according to claim 1 wherein the subsequent frames are dependent frames.

11. A non-transitory computer readable storage medium comprising computer-executable instructions for performing the method according to claim 1.

12. A method for streaming media from a media service to a remote media client; the method comprising the following steps performed by the media service:

a) receiving, from the remote media client, a request for the media at a starting time within the media;

b) providing the remote media client a first media package, comprising decoder configuration information, one or more frames of the media from the starting time onwards, associated timing information for playback of the one or more frames, and a pointer to a remaining portion of the media stream;

c) receiving from the media client a request for the remaining portion;

d) providing the subsequent frames and associated timing information as a stream to the media client.

13. The method according to claim 12 comprising:
making a first representation of the media available as a sequence of the first media packages;
making a second representation of the media available as a sequence of the subsequent frames of the media.

14. The method according to claim 13 wherein the providing the remote media client the first media package comprises retrieving the first media package from the first representation at the starting time; and
wherein the providing the media client the subsequent frames comprises retrieving the subsequent portions from the second representation from the pointer onwards.

15. A non-transitory computer readable storage medium comprising computer-executable instructions for performing the method according to claim 12 when the program is run on a computer.

* * * * *